US011513927B1

(12) United States Patent
Kanagovi et al.

(10) Patent No.: US 11,513,927 B1
(45) Date of Patent: Nov. 29, 2022

(54) METHOD AND SYSTEM FOR PERFORMING TESTING OPERATIONS FOR INFORMATION HANDLING SYSTEMS

(71) Applicant: Dell Products L.P., Round Rock, TX (US)

(72) Inventors: Ramakanth Kanagovi, Bengaluru (IN); Guhesh Swaminathan, Chennai (IN); Saheli Saha, Kolkata (IN); Jason Fay, Cedar Park, TX (US); Araiz Baqi, Pflugerville, TX (US); Sankunny Jayaprasad, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/583,492

(22) Filed: Jan. 25, 2022

(51) Int. Cl.
*G06F 11/26* (2006.01)

(52) U.S. Cl.
CPC .................................... *G06F 11/26* (2013.01)

(58) Field of Classification Search
CPC ........................................................ G06F 11/26
See application file for complete search history.

(56) References Cited

U.S. PATENT DOCUMENTS

| 8,418,000 | B1 * | 4/2013 | Salame | ................... | H04L 67/10 |
| | | | | | 714/26 |
| 10,063,570 | B2 * | 8/2018 | Muddu | ................ | H04L 63/1425 |
| 11,163,731 | B1 * | 11/2021 | Riddell | ................. | G06F 7/5443 |

(Continued)

FOREIGN PATENT DOCUMENTS

| CN | 114003422 A | * | 2/2022 |
| KR | 102317911 B1 | * | 10/2021 |

OTHER PUBLICATIONS

J. Wu, L. Yao, B. Liu and Z. Ding, "Automated Anomaly Detection Assisted by Discrimination Model for Time Series," 2019 IEEE/ACS 16th International Conference on Computer Systems and Applications (AICCSA), 2019, pp. 1-7 (Year: 2019).*

(Continued)

*Primary Examiner* — Matthew M Kim
*Assistant Examiner* — Indranil Chowdhury
(74) *Attorney, Agent, or Firm* — Chamberlain, Hrdlicka, White, Williams & Aughtry

(57) ABSTRACT

Techniques described herein relate to a method for performing testing operations for information handling systems. The method includes obtaining a test case from an information handling system; in response to obtaining the test case: obtaining log information associated with the test case from the information handling system; performing data preparation to generate processed subsequences using the log information; applying a plurality of prediction models to the processed subsequences and training data to generate anomalous subsequence predictions; generating ensemble anomaly scores and severity indexes associated with the processed subsequences using the anomalous subsequence predictions and the processed subsequences; making a determination that the ensemble anomaly scores and severity indexes associated with the processed subsequences result in detection of an anomalous subsequence; and in response to the determination: determining a next best test case associated with the anomalous subsequence; and initiating performance of the next best test case.

20 Claims, 4 Drawing Sheets

(56) References Cited

U.S. PATENT DOCUMENTS

| | | | | |
|---|---|---|---|---|
| 2015/0254172 A1* | 9/2015 | Baril | ............... | G06F 11/3466 |
| | | | | 717/128 |
| 2018/0351981 A1* | 12/2018 | Muddu | ............. | H04L 43/045 |
| 2022/0103444 A1* | 3/2022 | Ranjan | ............. | H04L 43/106 |

OTHER PUBLICATIONS

M. H. Bhuyan, D. K. Bhattacharyya and J. K. Kalita, "Network Anomaly Detection: Methods, Systems and Tools," in IEEE Communications Surveys & Tutorials, vol. 16, No. 1, pp. 303-336, First Quarter 2014 (Year: 2014).*

* cited by examiner

METHOD AND SYSTEM FOR PERFORMING TESTING OPERATIONS FOR INFORMATION HANDLING SYSTEMS

BACKGROUND

Computing devices may provide services. To provide the services, the computing devices may include hardware components and software components. The correct operation of the hardware components and software components may be imperative to users of the computing devices. The hardware and software components of the computing devices may be tested to ensure the correct operation of the computing devices.

SUMMARY

In general, certain embodiments described herein relate to a method for performing testing operations for information handling systems. The method may include obtaining, by a test manager, a test case from an information handling system; in response to obtaining the test case: obtaining log information associated with the test case from the information handling system; performing data preparation to generate processed subsequences using the log information; applying a plurality of prediction models to the processed subsequences and training data to generate anomalous subsequence predictions; generating ensemble anomaly scores and severity indexes associated with the processed subsequences using the anomalous subsequence predictions and the processed subsequences; making a determination that the ensemble anomaly scores and severity indexes associated with the processed subsequences result in detection of an anomalous subsequence; and in response to the determination: determining a next best test case associated with the anomalous subsequence; and initiating performance of the next best test case.

In general, certain embodiments described herein relate to a system for performing testing operations for information handling systems. The system includes information handling systems and a test manager associated with the information handling systems, which includes a processor and memory, and is programmed to: obtain a test case from an information handling system of the plurality of information handling systems; in response to obtaining the test case: obtain log information associated with the test case from the information handling system; perform data preparation to generate processed subsequences using the log information; apply a plurality of prediction models to the processed subsequences and training data to generate anomalous subsequence predictions; generate ensemble anomaly scores and severity indexes associated with the processed subsequences using the anomalous subsequence predictions and the processed subsequences; make a determination that the ensemble anomaly scores and severity indexes associated with the processed subsequences result in detection of an anomalous subsequence; and in response to the determination: determine a next best test case associated with the anomalous subsequence; and initiate performance of the next best test case.

In general, certain embodiments described herein relate to a non-transitory computer readable medium that includes computer readable program code, which when executed by a computer processor enables the computer processor to perform a method for performing testing operations for information handling systems. The method may include obtaining, by a test manager, a test case from an information handling system; in response to obtaining the test case: obtaining log information associated with the test case from the information handling system; performing data preparation to generate processed subsequences using the log information; applying a plurality of prediction models to the processed subsequences and training data to generate anomalous subsequence predictions; generating ensemble anomaly scores and severity indexes associated with the processed subsequences using the anomalous subsequence predictions and the processed subsequences; making a determination that the ensemble anomaly scores and severity indexes associated with the processed subsequences result in detection of an anomalous subsequence; and in response to the determination: determining a next best test case associated with the anomalous subsequence; and initiating performance of the next best test case.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1:
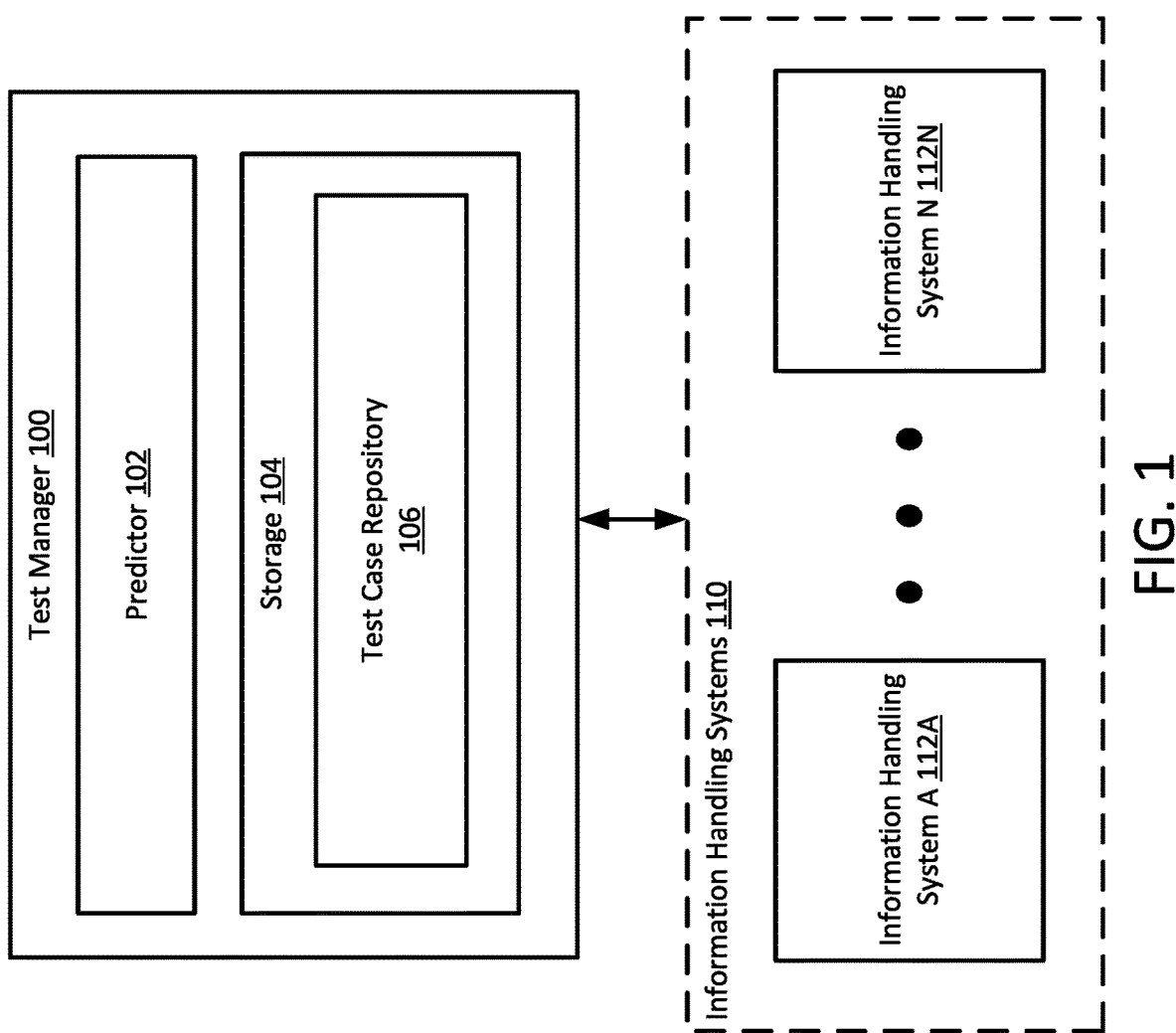
FIG. 1 shows a diagram of a system in accordance with one or more embodiments disclosed herein.

Specific embodiments will now be described with reference to the accompanying figures. In the following description, numerous details are set forth as examples of embodiments disclosed herein. It will be understood by those skilled in the art that one or more embodiments of the present embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein relate to systems, methods, and non-transitory computer readable mediums for performing testing operations for information handling systems.

In one or more embodiments disclosed herein, prior to selling and/or shipping information handling systems to customers, testing operations may be performed on the information handling systems to ensure the correct operation and functionality of the information handling systems before a customer obtains the information handling systems. The performance of testing operations may result in one or more issues and/or defects that the test engineer may identify and for which remediation may be initiated.

To perform testing operations, a user may select and perform test cases. A test case may be a set of actions and/or steps that may be performed on an information handling system to test the operation and functionality of the information handling system. Each information handling system may include different components and/or functionalities, therefore of the large number of potential test cases to perform on the information handling systems, only a portion of the test cases may be relevant to the information handling system. Additionally, it may be imperative that as many relevant test cases associated with an information handling system are performed during a testing operation to provide a comprehensive testing coverage of the information handling system which may ensure the correct operation of every component and/or functionality of the information handling system. However, due to the large number of types of information handling systems and the large number of potential relevant test cases, manually selecting test cases may be inefficient and unreliable.

Additionally, during the performance of a test case, log information associated with the test case may be generated. The log information may indicate the results of the performance of the test case. The log information may include anomalous results. In other words, the log information may include results that may be unusual and may require the performance of additional test cases to ensure the correct operation of information handling systems. However, due to the large quantity of log information, a test engineer performing the testing operation may miss the anomalous results.

To address, at least in part, the aforementioned issues, one or more embodiments disclosed herein may improve the operation of one or more computing devices. More specifically, embodiments disclosed herein relate to detecting anomalous subsequences of message codes corresponding to log information of test cases performed on an information handling system during a testing operation. A test manager may use an ensemble of prediction models to generate anomalous subsequence predictions which may be used to detect anomalous subsequences of message codes. Further, based on the detection of the anomalous subsequence, the test manager may identify the next best test case to perform during the testing operation. The next best test case may be the most dissimilar test case of a set of most similar test cases identified by comparing the processed subsequences of the test case with the processed subsequences of other test cases. By identifying the most dissimilar test case, the coverage of the testing operation may be expanded to a greater degree compared to performing the most similar test case. Thus, embodiments disclosed herein may improve the efficiency and accuracy of performing testing operations for information handling systems.

FIG. 1 shows a diagram of a system in accordance with one or more embodiments disclosed herein. The system may include a test manager (100) and information handling systems (110). The information handling systems (110) may include any quantity of information handling systems without departing from embodiments disclosed herein. For example, the information handling systems may include information handling system A (112A) and information handling system N (112N). The system may include other and/or additional devices and/or components without departing from embodiments disclosed herein. The devices and components of the system illustrated in FIG. 1 may be operatively connected via any combinations of wired (e.g., Ethernet) and/or wireless (e.g., WAN) connections without departing from embodiments disclosed herein.

In one or more embodiments disclosed herein, information handling systems (112A, 112N) include the functionality to perform computer implemented actions and/or services. The computer implemented actions and/or services may include any computer implemented functionality without departing from embodiments disclosed herein. The computer implemented functionality may include, for example, inferencing, training for machine learning, implementing in-memory databases, classification, data analysis, data processing, providing services to client devices, serving web content via the Internet, data backup services, etc.

In one or more embodiments disclosed herein, information handling systems (112A, 112N) are implemented as computing devices. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments disclosed herein, the test manager (100) includes the functionality to perform test case analysis as part of a testing operation for information handling systems (112A, 112N). For additional information regarding the functionality of the test manager (100), refer to FIGS. 2A-2B.

In one or more embodiments disclosed herein, the test manager (100) is implemented using one or more computing devices (described above).

To provide the aforementioned functionality to perform test case analysis as part of a testing operation for information handling systems (112A, 112N), the test manager (100) may include a predictor (102) and storage (104). The test manager (100) may include other and/or additional components without departing from embodiments disclosed herein. Each of the aforementioned components of the test manager (100) is discussed below.

In one or more embodiments disclosed herein, the predictor (102) includes the functionality to perform the aforementioned test case analysis functionality of the test manager (100). To perform the test case analysis, the predictor may include the functionality to: (i) obtain test cases and log information from information handling systems (112A, 112N), (ii) perform data preparation to generate processed subsequences, (iii) apply an ensemble of prediction models to the processed subsequences to generate anomalous subsequence predictions, (iv) generate ensemble anomaly scores and severity indexes associated with processed subsequences, (v) detect anomalous subsequences, (vi) determine the next best test case to perform based on anomalous subsequences, and (vii) initiate the performance of the next best test case. The predictor (102) may include other and/or additional functionalities without departing from embodiments disclosed herein.

In one or more embodiments disclosed herein, the predictor (102) is implemented as computer instructions, e.g., computer code, stored on a storage (e.g., 104) of the test manager (100) that when executed by a processor, hardware controller, or other component of the test manager (100) cause the test manager (100) to provide the functionality of the predictor (102) described throughout this application.

In one or more embodiments disclosed herein, the storage (104) is implemented using physical devices that provide data storage services (e.g., storing data and providing copies of previously stored data). The devices that provide data storage services may include hardware devices and/or logical devices. For example, storage (104) may include any quantity and/or combination of memory devices (e.g., volatile storage), long term storage devices (e.g., persistent storage), other types of hardware devices that may provide short term and/or long term data storage services, and/or logical storage devices (e.g., virtual persistent storage/virtual volatile storage).

For example, storage (104) may include a memory device (e.g., a dual in line memory device) in which data is stored and from which copies of previously stored data are provided. In another example, storage (104) may include a persistent storage device (e.g., a solid-state disk drive) in which data is stored and from which copies of previously stored data is provided. In a still further example, storage (104) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (104) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (104) may store data structures including, for example, a test case repository (106). The test case repository (106) may be one or more data structures that include all potential test cases that may be performed during a test operation. The test case repository (106) may include information associated with the test cases such as test case identifiers, the steps and/or actions associated with the test cases, etc. The test case repository (106) may include other and/or additional information associated with the test cases included in the test case repository (106) without departing from embodiments disclosed herein. The test case repository (106) may also include message codes and message code descriptions corresponding with the message codes associated with previous performances of the test cases included in the test case repository (106). The test case repository (106) may further include the master severity lists (e.g., the master list of critical severity message codes, the master list of warning severity message codes, and the master list of information severity message codes). The test case repository (106) may include other and/or additional information associated with the test cases without departing from embodiments disclosed herein. The test case repository (106) may be maintained over time by a user of the system (e.g., test engineer) by adding, modifying, and/or removing test cases, log information associated with test cases, and the master lists. The test case repository (106) may be used by the predictor to identify the next best test case to perform based on an anomalous subsequence.

The data structures discussed throughout this application may be implemented using, for example, lists, tables, unstructured data, databases, etc. While illustrated in FIG. 1 as being stored locally, the test case repository (106) may be stored remotely and may be distributed across any number of devices without departing from embodiments disclosed herein.

While FIG. 1 shows a configuration of components, other configurations may be used without departing from the scope of embodiments described herein. Accordingly, embodiments disclosed herein should not be limited to the configuration of components shown in FIG. 1.

Figure 2A:
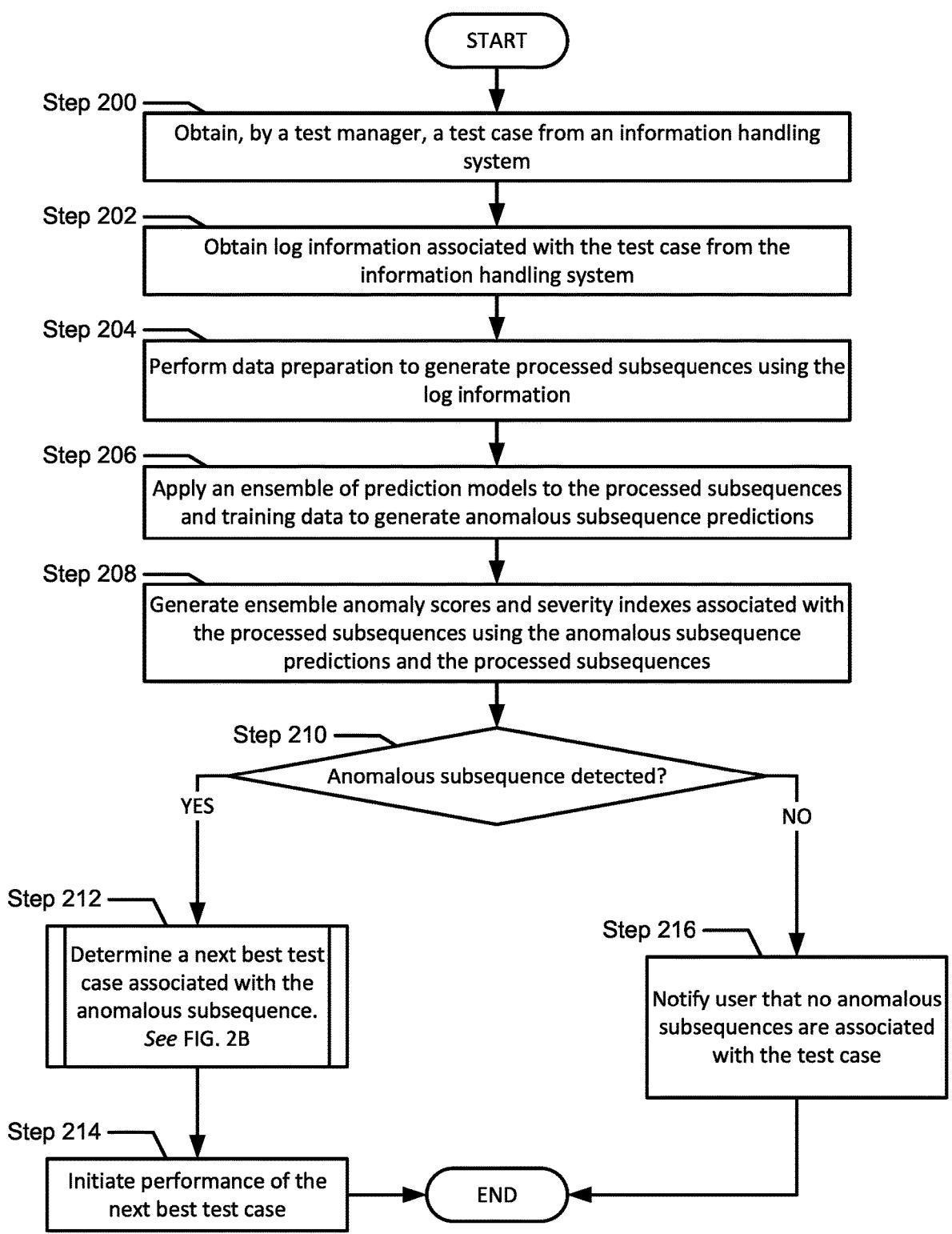
FIG. 2A shows a flowchart for performing test case analysis in accordance with one or more embodiments disclosed herein.

FIG. 2A shows a flowchart for performing test case analysis in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a test case is obtained by a test manager from an information handling system. During testing of the information handling system, the information handling system or a component of the information handling system (e.g., an information handling system controller or processor) may perform the test case and generate log information associated with the test case. Following the performance of the test case and the generation of the log information, the information handling system may directly, or indirectly (e.g., through a user such as a test engineer), send a message to the test manager. The message may include the test case and a request to perform test case analysis on the test case. The message may further include log information associated with the test case. The message may include other and/or additional information without departing from embodiments disclosed herein. The message may be obtained from the information handling system or a user (e.g., a test engineer).

The message may be provided to the test manager using any appropriate method of data transmission without departing from embodiments disclosed herein. As an example, the message may be transmitted as data packets through one or more network devices that operatively connect the test manager to the information handling system and/or a user. The test case may be obtained by the test manager via other and/or additional methods without departing from embodiments disclosed herein.

In Step 202, log information associated with the test case from the information handling system is obtained. As discussed above, the test manager may obtain a message that includes the test case. The message may further include log information associated with the test case to be used to perform test case analysis. The test manager may obtain the log information associated with the test case by parsing the message and identifying the log information.

In other embodiments disclosed herein, the message obtained in step 200 may also include log information identifiers (e.g., log file identifiers, data chunk identifiers associated with log information, etc.) and/or storage locations (e.g., pointers, storage addresses, etc.) associated with log information corresponding to the test case to be used to perform test case analysis. If the storage location is associated with a storage device that is not operatively connected to the test manager, then the message may further include communication information (e.g., network addresses, identifiers, encryption keys, etc.) that may be used to request and obtain the log information. The test manager may use the storage location and, if necessary, the identification information and the communication information to obtain the log information associated with the test case. The log information associated with the test case may be obtained from the information handling system via other and/or additional methods without departing from embodiments disclosed herein.

Log information may include one or more data structures that include information associated with the performance of test cases. As discussed above, test cases include steps and/or actions to perform on an information handling system to test the operation and functionalities of the information handling system. The log information may include a list of message codes. The list of message codes may include any quantity of message codes that indicate the results of each action and/or step of a test case. The message codes may include any combination of alphanumeric characters. Each message code may be associated with a message description that includes human readable text that may indicate the information that the message code is associated with. As an example, the message code "HWC9050" may be associated with the following message description "information handling system controller unable to communicate with the graphics processing unit device because the device is not ready or not responding." Each action and/or step included in a test case may be associated with one or more message codes. Each message code may be associated with a single corresponding message description. The log information may include other and/or additional information without departing from embodiments disclosed herein. The log information may be implemented as, for example, one or more log files.

The log information may be generated by the information handling system or a component of the information handling system which performed the test case. The log information may be used by the test manager to perform test case analysis and to determine next best test cases to perform based on anomalous subsequences. The log information may be generated via other and/or additional methods and may be used for other and/or additional purposes without departing from embodiments disclosed herein.

In Step 204, data preparation is performed to generate processed subsequences using the log information. In one or more embodiments disclosed herein, the predictor of the test manager performs the data preparation on the log information to generate the processed subsequences. The predictor may break the list of message codes into subsequences. A subsequence may refer to a portion of the message codes that includes a configurable quantity of message codes. As an example, the log information may include 50 message codes. The predictor may break the list of message codes into five subsequences, which each subsequence including ten message codes.

After generating the subsequences, the predictor may then transform the alphanumeric message codes of the subsequences into numerical representations of the message codes. The predictor may use any appropriate method of transforming alphanumeric data to numerical representations without departing from embodiments disclosed herein. As an example, the predictor may transform the message codes included in the subsequences to numerical representations using latent space representation techniques to generate vectors associated with the message codes of the subsequences. The predictor may encode the numerical representations of the message codes to reduce the dimensions of the generated vectors. The resulting vectors included in the subsequences may be referred to as processed subsequences. The predictor may use any appropriate method of encoding to reduce the dimensions of the vectors without departing from embodiments disclosed herein.

As a result, the log information may be transformed into a format usable by the predictor to apply the one or more prediction models of the ensemble of prediction models. Therefore, the log information may be used to generate anomalous subsequence predictions associated with the test case to perform the test case analysis. Data preparation may be performed to generate processed subsequences using the log information via other and/or additional methods without departing from embodiments disclosed herein.

In Step 206, an ensemble of prediction models are applied to the processed subsequences and training data to generate anomalous subsequence predictions. The predictor may input the processed subsequences into the ensemble of prediction models to generate anomalous subsequence predictions. An anomalous subsequence prediction may refer to a value, flag, or other prediction model output that indicates whether a processed subsequence is predicted to be an anomaly compared to previous and/or other subsequences associated with previous and/or other test cases.

The ensemble of prediction models may refer to any quantity of prediction models without departing from embodiments disclosed herein. The ensemble of prediction models may include different types of prediction models to improve the accuracy of anomalous subsequence predictions. The ensemble of prediction models may include, for example, a variational autoencoder model, a Copula based outlier detection model, an isolation forest model, a clustering based local outlier factor model, a locally selective combination of parallel outlier ensembles model, and/or other types of prediction models with the functionality to generate anomalous subsequence predictions without departing from embodiments disclosed herein.

Prior to, or during, the generation of the anomalous subsequence predictions, the predictor applies prediction algorithms associated with the prediction models to training data to generate or train the ensemble of prediction models. The predictor may introduce to the prediction algorithm to the training data to generate and/or train the ensemble of prediction models. The prediction algorithms may include, for example, a variational autoencoder algorithm, a Copula based outlier detection algorithm, an isolation forest algorithm, a clustering based local outlier factor algorithm, a locally selective combination of parallel outlier ensembles algorithm, and/or other types of prediction algorithms without departing from embodiments disclosed herein. The predictor may perform any appropriate method of model training to generate the ensemble of prediction models (e.g., verification, optimization, etc.). As a result, the ensemble of prediction models may be generated.

The training data may include one or more data structures that include a large quantity of processed subsequences of message codes associated with a large quantity of other test cases. The training data may include more processed subsequences than the processed subsequences generated in Step 204. The processed subsequences of the training data may be used by a prediction model of the ensemble of prediction models to predict whether a processed subsequence of the test case for which the test case analysis is performed is anomalous. An anomalous subsequence may refer to a subsequence of message codes that is different (e.g., includes a different ordered list of message codes) than the subsequences included in the training data. The training data may be obtained from the test case repository (discussed below) or obtained from a user (e.g., a test engineer). The training data may include other and/or additional information that may be used to generate the ensemble of prediction models without departing from embodiments disclosed herein.

The ensemble of prediction models may be applied to the processed subsequences and training data to generate anomalous subsequence predictions via other and/or additional methods without departing from embodiments disclosed herein.

In Step 208, ensemble anomaly scores and severity indexes associated with processed subsequences are generated using the anomalous subsequence predictions and the processed subsequences. As discussed above, each prediction model in the ensemble of prediction models generates an anomalous subsequence prediction for each subsequence included in the processed subsequences. For each processed subsequence, the predictor may generate an ensemble anomaly score. The ensemble anomaly score associated with a processed subsequence may include the total number of prediction models that generate an anomalous subsequence prediction that indicates that the processed subsequence is an anomalous subsequence. To generate an ensemble anomaly score for a processed subsequence, the predictor may calculate the total number of prediction models in the ensemble of prediction models that generate anomalous subsequence predictions that indicate the processed subsequence is an anomalous subsequence.

The predictor may also generate a severity index associated with each processed subsequence. The severity index may indicate the severity of the message codes included in a subsequence. A message code may be associated with an informational severity (e.g., low severity), a warning severity (e.g., medium severity), or a critical severity (e.g., high severity). The severity index may include the severity associated with each message code in a subsequence. To generate the severity index, the predictor may compare each message code in the subsequence with master lists of critical severity message codes, warning severity message codes, and informational severity message codes. The master list of critical severity message codes may include all possible message codes that are associated with a critical severity. The master list of warning severity message codes may include all possible message codes that are associated with a warning severity. The master list of informational severity message codes may include all possible message codes that are associated with an informational severity. The predictor may match the message codes included in the subsequence with the message codes included in the master lists and assign the corresponding severity to message code in the severity index based on which master list in which the message code was identified.

The ensemble anomaly scores and the severity indexes associated with the processed subsequences may be generated using the anomalous subsequence predictions and the processed subsequences via other and/or additional methods without departing from embodiments disclosed herein.

In Step 210, a determination is made as to whether an anomalous subsequence is detected. As discussed above, each processed subsequence may include an ensemble anomaly score and a severity index. The predictor may use the ensemble anomaly score and the severity index associated with a processed subsequence to determine whether the processed subsequence is an anomalous subsequence. The predictor may include or otherwise have access to a configurable ensemble anomaly score threshold, a critical severity threshold, and a warning severity threshold. For each processed subsequence, the predictor may compare the ensemble anomaly score to the ensemble anomaly score threshold and the severity index to the critical severity threshold and the warning severity threshold.

If the ensemble anomaly score matches or exceeds the ensemble anomaly score threshold and/or the severity index includes a quantity of critical severity message codes and/or warning severity message codes that match or exceed the critical severity threshold and/or the warning severity threshold, then the predictor may determine that the processed subsequence is an anomalous subsequence. If the ensemble anomaly score does not match or exceed the ensemble anomaly score threshold and/or the severity index includes a quantity of critical severity message codes and/or warning severity message codes that do not match or exceed the critical severity threshold and/or the warning severity threshold, then the predictor may determine that the processed subsequence is not an anomalous subsequence. If the predictor determines that one or more processed subsequences is an anomalous subsequence, then the predictor may determine that an anomalous subsequence has been detected. If the predictor determines that no processed subsequence is an anomalous subsequence, then the predictor may determine that an anomalous subsequence has not been detected.

The determination as to whether an anomalous subsequence has been detected may be made via other and/or additional methods without departing from embodiments disclosed herein.

In one or more embodiments disclosed herein, if it is determined that an anomalous subsequence is detected, then the method proceeds to step 212. In one or more embodiments disclosed herein, if it is determined that no anomalous subsequence is detected, then the method proceeds to step 216.

In Step 212, a next best test case associated with the anomalous subsequence is determined. For each anomalous subsequence that was detected in step 210, the predictor may use the anomalous subsequence to identify the next best test case to perform to ensure optimal performance and functionality of the information handling system associated with the test case. For additional information regarding determining the next best test case associated with the anomalous subsequence, refer to FIG. 2B.

In Step 214, performance of the next best test case is initiated. In one or more embodiments disclosed herein, the predictor sends the identified next best test case to the information handling system. In response to obtaining the next best test case, the information handling system or a component of the information handling system may perform the next best test case. In the event of other test cases being performed on the information handling system, the information handling system, or component thereof, may include the next best test case into a queue of test cases to be performed on the information handling system. The next best test case may be proved to the information handling system as part of a message. The message may be provided to the information handling system using any appropriate method of data transmission without departing from embodiments disclosed herein. As an example, the message may be transmitted as data packets through one or more network devices that operatively connect the test manager to the information handling system.

In other embodiments disclosed herein, the predictor may provide the next best test case to a user (e.g., test manager). The user may determine whether to perform the next best test case and then initiate the performance of the test case by providing the test case to the information handling system as discussed above. The next best test case may be provided to the user as part of a message. The message may be provided to the user using any appropriate method of data transmission without departing from embodiments disclosed herein. As an example, the message may be transmitted as data packets through one or more network devices that operatively connect the test manager to the user or entity used by the user (e.g., a client). Performance of the next best test case may be initiated via other and/or additional methods without departing from embodiments disclosed herein.

In one or more embodiments disclosed herein, the method ends following step 214.

In Step 216, a user is notified that no anomalous subsequences are associated with the test case. In one or more embodiments disclosed herein, the predictor sends a message to a user (e.g., a test engineer). The message may include a notification that no anomalous subsequences were identified based on the test case analysis of the test case. As a result, the test engineer may continue performing the testing operation of the information handling system. The message may be provided to the user using any appropriate method of data transmission without departing from embodiments disclosed herein. As an example, the message may be transmitted as data packets through one or more network devices that operatively connect the test manager to the user or entity used by the user (e.g., a client). Performance of the next best test case may be initiated via other and/or additional methods without departing from embodiments disclosed herein. A user may be notified that no anomalous subsequences are associated with the test case via other and/or additional methods without departing from embodiments disclosed herein.

In one or more embodiments disclosed herein, the method ends following step 216.

Figure 2B:
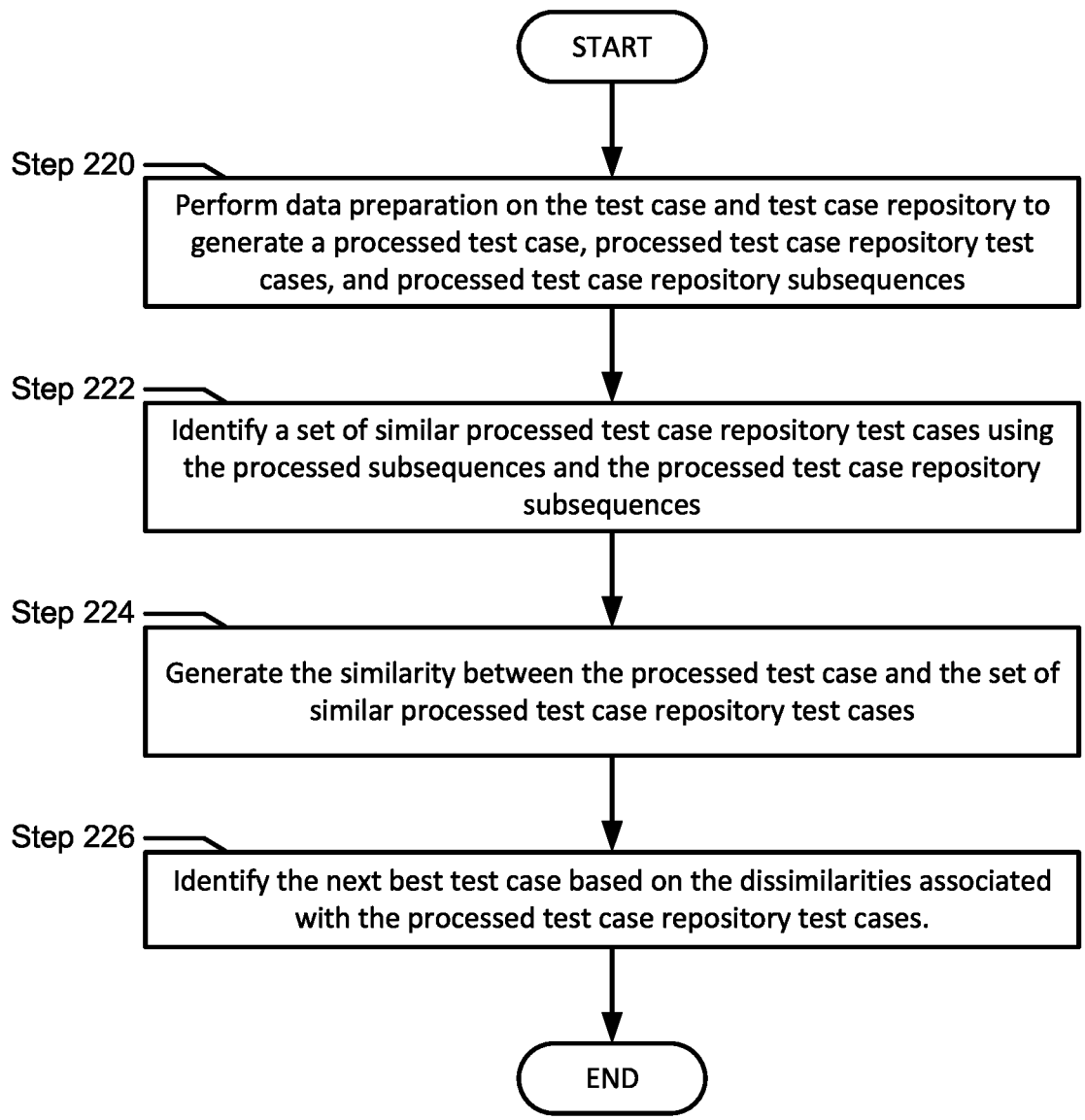
FIG. 2B shows a flowchart for identifying the next best test case based on an anomalous subsequence in accordance with one or more embodiments disclosed herein.

FIG. 2B shows a flowchart for identifying the next best test case based on an anomalous subsequence in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, data preparation is performed on the test case and test case repository to generate a processed test case, processed test case repository test cases, and processed test case repository subsequences. In one or more embodiments disclosed herein, the predictor obtains previous test cases and log information associated with the previous test cases. The predictor performs data preparation on the test case repository test cases and the log information associated with the test case repository test cases to generate processed test case repository test cases and processed test case repository subsequences. Additionally, the predictor also performs data preparation on the test case obtained in Step 200 of FIG. 2A to generate a processed test case. The data preparation may be similar to the data preparation discussed above in Step 204 of FIG. 2A. As a result, the processed test case, the processed test case repository test cases, and the processed test case repository subsequences associated with the processed test cases may be numerical representations of the test case, the test case repository test cases, and the test case repository test case subsequences. Therefore, the processed test case, the processed test case repository test cases, and the processed test case repository subsequences may be used to perform similarity calculations. Data preparation may be performed on the test case and the test case repository to generate a processed test case, processed test case repository test cases, and processed test case repository subsequences via other and/or additional methods without departing from embodiments disclosed herein.

In Step 222, a set of similar processed test case repository test cases are identified using the processed subsequences and the processed test case repository subsequences. To identify a set of similar processed test case repository test cases, the predictor may calculate the similarity of the test case repository test case subsequences associated with each processed test case repository test case with the processed subsequences of the test case for which test case analysis is performed. The similarity may be calculated using any appropriate numerical representation comparison method without departing from embodiments disclosed herein. For example, the predictor may calculate the cosine distance between the processed subsequences and the test case repository processed sequences. The predictor may identify a set of processed test case repository test cases associated with processed test case repository subsequences that include the smallest cosine distance (e.g., the most similar) compared to the processed subsequence. The set of processed test case repository test cases may include any quantity of processed test case repository test cases without departing from embodiments disclosed herein. The set of similar processed test case repository test cases may be identified using the processed subsequences and the processed test case repository subsequences via other and/or additional methods without departing from embodiments disclosed herein.

In Step 224, similarity between the processed test case and the set of similar processed test case repository test cases is generated. The predictor may generate a similarity between the processed test case and the set of processed test case repository test case using any appropriate method of numerical representation comparison without departing from embodiments disclosed herein. For example, the predictor may calculate the cosine distance between the processed test case and each processed test case repository test case in the set of similar processed test case repository test cases. The similarity between the processed test case and the set of similar processed test case repository test cases may be generated via other and/or additional methods without departing from embodiments disclosed herein.

In Step 226, the next best test case is identified based on the dissimilarity between the processed test case and the set of similar processed test case repository test cases. In one or more embodiments disclosed herein, the predictor uses the similarities generated in Step 224 to identify the next best test case. As discussed above, the similarities may include the cosine distance between the processed test case and each of the set of similar processed test case repository test cases. The predictor may identify the processed test case repository test case of the set of similar processed test case repository test cases associated with the largest cosine distance (e.g., the most dissimilar) compared to the processed test case as the next best test case. The next best test case may be identified based on the dissimilarity between the processed test case and the set of similar processed test case repository test cases via other and/or additional methods without departing from embodiments disclosed herein.

In one or more embodiments disclosed herein, the method ends following step 226.

EXAMPLE

The following section describes an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Consider a scenario in which a company manufactures and sells servers.

When a server is sold, an employee of the company performs a testing operation on the server to ensure the correct operation and functionality of the server prior to shipping the server to the customer. The employee may be a test engineer.

To perform the test operation, the test engineer performs a series of test cases on the server (e.g., an information handling system (112A, FIG. 1). During the performance of a test case, a server controller of the server generates log information associated with the test case. To aid in the testing operation and to ensure proper testing coverage, the test engineer may provide the test case and the log information associated with the test case to a test manager (e.g., 100, FIG. 1) with a request to perform test case analysis. In response to obtaining the test case and the log information associated with the test case, the test manager performs data preparation to transform the log information into processed subsequences. The log information includes fifty message codes. The generated processed subsequences include five processed subsequences, each with ten numerical representations of the message codes. The test manager may then reduce the dimensions associated with the processed subsequences to finalize the data preparation so that the processed subsequences may be compatible with an ensemble of prediction models.

After generating the processed subsequences, the test manager applies an ensemble of prediction models to the five processed subsequences and training data. The training data includes 20000 processed subsequences associated with 1500 previously performed test cases included in a test case repository. The ensemble of prediction models includes a variational autoencoder model, an isolation forest model, and a Copula based outlier detection model. Each prediction model of the ensemble of prediction model determines that first, second, and third processed subsequences are not anomalous subsequences. The isolation forest model determines that the fourth processed subsequence is an anomalous subsequence, while the other two prediction models determine that the fourth processed subsequence is not an anomalous subsequence. Finally, the isolation forest model and the variational autoencoder model determine that the fifth processed subsequence is an anomalous subsequence while the remaining prediction model determines that the fifth processed subsequence is not an anomalous subsequence. The test manager then generates an ensemble anomaly score of zero for each of the first, second, and third processed subsequences. The test manager generates an ensemble anomaly score of one or the fourth processed subsequence, and an ensemble anomaly score of two for the fifth processed subsequence.

Additionally, the test manager generates a severity index associated with each of the five processed subsequences. The first, second, and third processed subsequences include message codes that are all included in the master list of message codes associated with an informational severity. Therefore, the test manager generates severity indexes for the first, second, and third processed subsequences that indicates that all message codes include the informational severity. The fourth processed subsequence includes one message code that is included in the master list of message codes associated with a warning severity and the rest of the message codes are included in the master list of message codes associated with an informational severity. Therefore, the test manager generates a severity index for the fourth processed subsequence that indicates that one message codes includes a warning severity and the remaining message codes include the informational severity. Finally, the fifth processed subsequence includes two message codes that are included in the master list of message codes associated with a critical severity and the rest of the message codes are included in the master list of message codes associated with an informational severity. Therefore, the test manager generates a severity index for the fifth processed subsequence that indicates that two message codes include a critical severity and the remaining message codes include the informational severity.

The test manager then compares the ensemble anomaly scores and severity indexes associated with the five processed subsequences with the ensemble anomaly score threshold, the critical severity threshold, and the warning severity threshold to determine whether any of the five processed subsequences are anomalous subsequences. The ensemble anomaly score threshold is two, the critical severity threshold is two, and the warning severity threshold is five. Based on the ensemble anomaly scores and the severity indexes associated with the five processed subsequences, only the fifth processed subsequence is associated with an ensemble anomaly score that matches or exceeds the ensemble anomaly score threshold and a severity index that matches or exceeds the critical severity threshold. Therefore, the test manager detects that the fifth processed subsequence is the only processed subsequence that is an anomalous subsequence.

In response to detecting the anomalous subsequence, the test manager then identifies the next best test case. To do so, the test manager performs data preparation on the obtained test case and the 1500 test cases included in the test case repository to generate a processed test case and processed test case repository test cases. The test manager then calculates the cosine distance between the processed subsequences associated with the test case and the processed test case repository processed subsequences (generated during training of the ensemble of prediction models). The test manager then identifies a set of similar processed test case repository test cases that include processed subsequences that are associated with the smallest cosine distance (e.g., most similar) compared to the processed subsequence. The set of similar processed test case repository test cases includes ten processed test case repository test cases. The test manager then calculates the cosine distance between the processed test case and each processed test case repository test case included in the set of ten similar processed test case repository test cases. The test manager then identifies test case repository test case corresponding to the processed test case repository test case associated with the greatest cosine distance (e.g., the most dissimilar test case repository test case) compared to the processed test case as the next best test case.

After identifying the next best test case, the test manager provide the next best test case to the test engineer. The test engineer then adds the next best test case to the queue of test cases to perform during the testing operation of the server. After running all test cases and resolving all issues identified during the testing operation, the company ships the server to the customer.

End of Example

Figure 3:
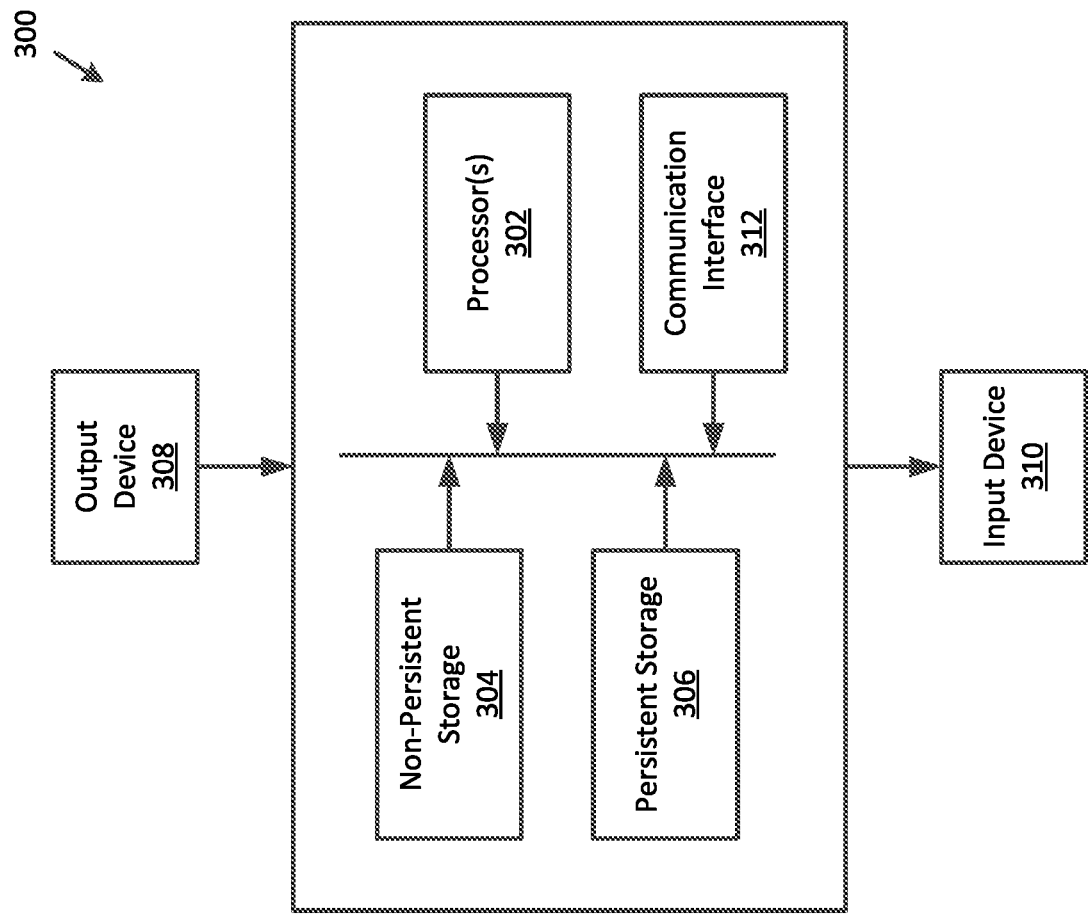
FIG. 3 shows a diagram of a computing device in accordance with one or more embodiments disclosed herein.

As discussed above, embodiments disclosed herein may be implemented using computing devices. FIG. 3 shows a diagram of a computing device in accordance with one or more embodiments disclosed herein. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment disclosed herein, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the disclosed herein, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

One or more embodiments disclosed herein may be implemented using instructions executed by one or more processors of the data management device. Further, such instructions may correspond to computer readable instructions that are stored on one or more non-transitory computer readable mediums.

One or more embodiments disclosed herein may improve the operation of one or more computing devices. More specifically, embodiments disclosed herein relate to detecting anomalous subsequences of message codes corresponding to log information of test cases performed on an information handling system during a testing operation. A test manager may use an ensemble of prediction models to generate anomalous subsequence predictions which may be used to detect anomalous subsequences of message codes. Further, based on the detection of the anomalous subsequence, the test manager may identify the next best test case to perform during the testing operation. The next best test case may be the most dissimilar test case of a set of most similar test cases identified by comparing the processed subsequences of the test case with the processed subsequences of other test cases. By identifying the most dissimilar test case, the coverage of the testing operation may be expanded to a greater degree compared to performing the most similar test case.

In traditional systems, a user (e.g., a test engineer) may manually select and perform test cases during a testing operation. Due to the quantity of types of information handling systems and the quantity of test cases to perform, manually selecting test cases to perform may be time costly and prone to human error in both selecting relevant test cases and detecting anomalous test case results that may require the performance of additional test cases. Thus, embodiments disclosed herein improve the efficiency and accuracy of performing testing operations for information handling systems.

Thus, embodiments disclosed herein may address the problem of inefficient use of computing resources to test computing devices. This problem arises due to the technological nature of the environment in which the computing devices are tested.

The problems discussed above should be understood as being examples of problems solved by embodiments disclosed herein and the embodiments disclosed herein should not be limited to solving the same/similar problems. The disclosed embodiments are broadly applicable to address a range of problems beyond those discussed herein.

While the embodiments disclosed herein has been described with respect to a limited number of embodiments, those skilled in the art, having benefit of this disclosure, will appreciate that other embodiments can be devised which do not depart from the scope of the technology as disclosed herein. Accordingly, the scope of the embodiments disclosed herein should be limited only by the attached claims.

What is claimed is:

1. A method for performing testing operations for information handling systems, the method comprising:
    obtaining, by a test manager, a test case from an information handling system;
    in response to obtaining the test case:
        obtaining log information associated with the test case from the information handling system;
        performing data preparation to generate processed subsequences using the log information;
        applying a plurality of prediction models to the processed subsequences and training data to generate anomalous subsequence predictions;
        generating ensemble anomaly scores and severity indexes associated with the processed subsequences using the anomalous subsequence predictions and the processed subsequences;
        making a determination that the ensemble anomaly scores and the severity indexes associated with the processed subsequences result in detection of an anomalous subsequence; and
        in response to the determination:
            determining a next best test case associated with the anomalous subsequence; and
            initiating performance of the next best test case.

2. The method of claim 1, wherein the log information comprises message codes associated with the test case.

3. The method of claim 2, wherein a processed subsequence of the processed subsequences comprises a processed portion of the message codes.

4. The method of claim 3, wherein a severity index of the severity indexes associated with the processed subsequence specifies:
    a first portion of the message codes associated with critical severity;
    a second portion of the message codes associated with warning severity; and
    a third portion of the message codes associated with informational severity.

5. The method of claim 1, wherein the training data comprises second processed subsequences.

6. The method of claim 1, wherein an ensemble anomaly score of the ensemble anomaly scores associated with a processed subsequence of the processed subsequences specifies a quantity of prediction models included in the plurality of prediction models that determine the processed subsequence is the anomalous subsequence.

7. The method of claim 1, wherein determining the next best test case associated with the anomalous subsequence comprises:
    performing data preparation on the test case and a test case repository to generate a processed test case, processed test case repository test cases, and processed test case repository subsequences;
    identifying a set of similar processed test case repository test cases using the processed subsequences and the processed test case repository subsequences;
    generating a similarity between the processed test case and the set of similar processed test case repository test cases; and
    identifying the next best test case based on the similarities associated with the set of similar processed test case repository test cases, wherein the next best test case comprises a processed test case repository test case of the set of similar processed test case repository test cases that is most dissimilar to the processed test case.

8. A non-transitory computer readable medium comprising computer readable program code, which when executed by a computer processor enables the computer processor to perform a method for performing testing operations for information handling systems, the method comprising:
    obtaining, by a test manager, a test case from an information handling system;
    in response to obtaining the test case:

obtaining log information associated with the test case from the information handling system;

performing data preparation to generate processed subsequences using the log information;

applying a plurality of prediction models to the processed subsequences and training data to generate anomalous subsequence predictions;

generating ensemble anomaly scores and severity indexes associated with the processed subsequences using the anomalous subsequence predictions and the processed subsequences;

making a determination that the ensemble anomaly scores and the severity indexes associated with the processed subsequences result in detection of an anomalous subsequence; and in response to the determination:

determining a next best test case associated with the anomalous subsequence; and initiating performance of the next best test case.

9. The non-transitory computer readable medium of claim 8, wherein the log information comprises message codes associated with the test case.

10. The non-transitory computer readable medium of claim 9, wherein a processed subsequence of the processed subsequences comprises a processed portion of the message codes.

11. The non-transitory computer readable medium of claim 10, wherein a severity index of the severity indexes associated with the processed subsequence specifies:

a first portion of the message codes associated with critical severity;

a second portion of the message codes associated with warning severity; and a third portion of the message codes associated with informational severity.

12. The non-transitory computer readable medium of claim 8, wherein the training data comprises second processed subsequences associated with a plurality of test cases.

13. The non-transitory computer readable medium of claim 8, wherein an ensemble anomaly score of the ensemble anomaly scores associated with a processed subsequence of the processed subsequences specifies a quantity of prediction models included in the plurality of prediction models that determine the processed subsequence is the anomalous subsequence.

14. The non-transitory computer readable medium of claim 8, wherein determining the next best test case associated with the anomalous subsequence comprises:

performing data preparation on the test case and a test case repository to generate a processed test case, processed test case repository test cases, and processed test case repository subsequences;

identifying a set of similar processed test case repository test cases using the processed subsequences and the processed test case repository subsequences;

generating a similarity between the processed test case and the set of similar processed test case repository test cases; and identifying the next best test case based on the similarities associated with the set of similar processed test case repository test cases, wherein the next best test case comprises a processed test case repository test case of the set of similar processed test case repository test cases that is most dissimilar to the processed test case.

15. A system for performing testing operations, comprising:

a plurality of information handling systems;

and a test manager associated with the plurality of information handling systems, comprising a processor and memory, programmed to:

obtain a test case from an information handling system of the plurality of information handling systems;

in response to obtaining the test case:

obtain log information associated with the test case from the information handling system;

perform data preparation to generate processed subsequences using the log information;

apply a plurality of prediction models to the processed subsequences and training data to generate anomalous subsequence predictions;

generate ensemble anomaly scores and severity indexes associated with the processed subsequences using the anomalous subsequence predictions and the processed subsequences;

make a determination that the ensemble anomaly scores and the severity indexes associated with the processed subsequences result in detection of an anomalous subsequence; and in response to the determination:

determine a next best test case associated with the anomalous subsequence; and initiate performance of the next best test case.

16. The system of claim 15, wherein the log information comprises message codes associated with the test case.

17. The system of claim 16, wherein a processed subsequence of the processed subsequences comprises a processed portion of the message codes.

18. The system of claim 17, wherein a severity index of the severity indexes associated with the processed subsequence specifies:

a first portion of the message codes associated with critical severity;

a second portion of the message codes associated with warning severity; and a third portion of the message codes associated with informational severity.

19. The system of claim 15, wherein the training data comprises second processed subsequences.

20. The system of claim 15, wherein an ensemble anomaly score of the ensemble anomaly scores associated with a processed subsequence of the processed subsequences specifies a quantity of prediction models included in the plurality of prediction models that determine the processed subsequence is the anomalous subsequence.

* * * * *